US008009287B2

(12) United States Patent
Abel et al.

(10) Patent No.: US 8,009,287 B2

(45) Date of Patent: Aug. 30, 2011

(54) METHOD AND SYSTEM FOR HIGH THROUGHPUT MASS ANALYSIS

(75) Inventors: Bernd Abel, Dransfeld (DE); Jürgen Troe, Göttingen (DE); Ales Charvat, Göttingen (DE)

(73) Assignees: Max-Planck-Gesellschaft zur Foerderung der Wissenschaften e.V., Munich (DE); Georg-August-Universitat Gottingen, Gottingen (DE)

( * ) Notice: Subject to any disclaimer, the term of this patent is extended or adjusted under 35 U.S.C. 154(b) by 857 days.

(21) Appl. No.: 11/721,832

(22) PCT Filed: Dec. 15, 2005

(86) PCT No.: PCT/EP2005/056835

§ 371 (c)(1), (2), (4) Date: Jun. 15, 2007

(87) PCT Pub. No.: WO2006/064048

PCT Pub. Date: Jun. 22, 2006

(65) Prior Publication Data

US 2009/0321627 A1 Dec. 31, 2009

(30) Foreign Application Priority Data

Dec. 17, 2004 (EP) .................................... 04030063

(51) Int. Cl.
*G01N 1/10* (2006.01)

(52) U.S. Cl. ...................................................... 356/246

(58) Field of Classification Search .................. 356/246, 356/315

See application file for complete search history.

(56) References Cited

U.S. PATENT DOCUMENTS

| | | | | |
|---|---|---|---|---|
| 3,625,614 | A * | 12/1971 | Herrmann et al. | 356/315 |
| 3,679,312 | A * | 7/1972 | Mansberg | 356/246 |
| 4,403,147 | A | 9/1983 | Melera et al. | |
| 6,140,639 | A * | 10/2000 | Gusev et al. | 250/288 |
| 6,147,344 | A | 11/2000 | Annis et al. | |
| 6,744,041 | B2 * | 6/2004 | Sheehan et al. | 250/283 |
| 7,247,487 | B2 * | 7/2007 | Jacobs et al. | 422/81 |

(Continued)

FOREIGN PATENT DOCUMENTS

WO 2004076071 A1 9/2004

OTHER PUBLICATIONS

Charvat et al., "Analytical laser induced liquid beam desoprtion mass spectrometry of protonated amino acids and their non-covalently bound aggregrates", The European Physical Journal D, vol. 20, pp. 573-582.*

(Continued)

*Primary Examiner* — Kara E Geisel

(74) *Attorney, Agent, or Firm* — Caesar, Rivise, Bernstein, Cohen & Pokotilow, Ltd.

(57) ABSTRACT

The invention relates to a test method, especially for mass spectroscopy of biomolecules, including the following steps: one or several samples (2-4) that are to be analyzed are introduced into a carrier liquid of a micro liquid jet (1) in rapid succession; at least some of the samples (2-4) are desorbed from the micro liquid jet (1); and the sample (2-4) that is desorbed from the micro liquid jet (1) is analyzed. According to the invention, the sample (2-4) is spatially delimited in the spraying direction in the micro liquid jet (1) while extending only along a subarea of the micro liquid jet (1) in the spraying direction.

25 Claims, 3 Drawing Sheets

U.S. PATENT DOCUMENTS

| | | | |
|---|---|---|---|
| 2002/0072126 | A1 | 6/2002 | Chervet et al. |
| 2004/0222373 | A1 | 11/2004 | Oser et al. |

OTHER PUBLICATIONS

Sobott et al., "Laser desorption mass spectrometry on thin liquid jets", 1998, Fresenius J Analytical Chemistry, 360, pp. 745-749.*

International Search Report for PCT/EP2005/056835.

Charvat, et al., "New design for a time-of-flight mass spectrometer with a liquid beam laser desorption ion source for the analysis of biomolecules", Rev. Sci. Instrum., vol. 75, No. 5, (2004), pp. 1209-1218.

Spangenberg, et al., "Laser-angeregte Mikrofilamente fur extreme Lichtquellen und Biomolekulanalytik", Photonik (2004), pp. 1-5.

* cited by examiner

METHOD AND SYSTEM FOR HIGH THROUGHPUT MASS ANALYSIS

BACKGROUND OF THE INVENTION

The invention relates to a test method and a corresponding test system, in particular for the mass spectroscopy of biomolecules, in accordance with the preamble of the independent claims.

It is known from SPANGENBERG, Tim; ABEL, Bernd: "Laser-angeregte Mikrofilamente für extreme Lichtquellen und Biomolekülanalytik", Photonik June 2004 that so-called micro liquid jets are used for the mass spectroscopic analysis of large biopolymers, organic molecules and ions. The samples to be analyzed (e.g., biopolymers) are dissolved in water as carrier liquid, and the carrier liquid with the sample dissolved in it is injected through a micronozzle into a vacuum so that a stable micro liquid jet forms in the vacuum that has a jet diameter in a range of 5-100 μm and a jet speed of 30-100 m/s. Then, molecules are desorbed from this micro liquid jet by irradiation with pulsed, adjustable infrared laser light and subsequently analyzed by mass spectroscopy. This laser-induced desorption of sample molecules from the micro liquid jet advantageously makes a very gentle release of the sample molecules possible.

These known test methods have the following disadvantages: On the one hand the relatively high consumption of sample substance, since the sample substance contained in the micro liquid jet is not desorbed between the successive laser impulses and therefore remains unused. The yield of the sample substance can be increased here at the most by increasing the impulse rate of the laser, which, however, is only possible to a limited extent.

On the other hand, the initially described, known test method only makes it possible to analyze a single sample substance that is dissolved in the carrier liquid of the micro liquid jet. In order to analyze another sample substance, the carrier liquid with the old sample substance must first be replaced, which means an enormous effort. The initially described, known test method therefore does not make possible a high throughput mass analysis of a plurality of samples.

It is therefore an object of the invention to improve the initially described, known test method and the associated test system in an appropriate manner.

SUMMARY OF THE INVENTION

This object is achieved by a test method and a test system in accordance with the invention.

The invention comprises the general technical teaching of introducing spatially delimited samples into the carrier liquid of the micro liquid jet that extend in the jet direction only along a portion of the micro liquid jet. Such a locally delimited injection of the samples to be analyzed into the carrier liquid of the micro liquid jet advantageously makes possible a rapid replacement of the samples to be analyzed in that the various samples are successively injected into the micro liquid jet and analyzed one after the other. Moreover, the consumption of sample substance is significantly reduced by the spatially delimited injection of the samples.

In a high throughput mass analysis preferably several samples are introduced into the micro liquid jet in this instance so that the individual samples in the micro liquid jet are successively arranged and spatially separated from each other in the jet direction. The individual samples therefore form plugs or segments in this instance in the micro liquid jet, that otherwise consists of the carrier liquid (e.g., water).

The injection of the individual samples into the carrier liquid can take place, e.g., by a controllable valve preferably arranged upstream in front of the micronozzle used to produce a micro liquid jet. The valve used can be, e.g., a high-pressure valve (HPLC valve) such as, e.g., the Gynotek model 300C.

If the switching times of such valves are too large to inject the samples into the carrier liquid with a sufficiently high cycle frequency, there is the possibility of arranging several such valves one below the other in the direction of flow.

In this instance, the valves empty preferably into a carrier flow channel that feeds the micronozzle in order to produce the micro liquid jet.

Furthermore, the scope of the invention includes the possibility that the individual samples contain different sample substances so that a mass throughput analysis of a plurality of different samples is made possible.

The desorption of the individual samples from the micro liquid jet can take place within the scope of the invention in a traditional manner by laser irradiation, e.g., by irradiation with pulsed, adjustable infrared laser light, that is known from the initially cited publication SPANGENBERG, Tim; ABEL, Bernd: "Laser-angeregte Mikrofilamente für extreme Lichtquellen und Biomolekülanalytik" as well as from CHARVAT, A. et al.: "New design for a time-of-flight mass spectrometer with a liquid beam laser desorption source for the analysis of biomolecules", Review of scientific instruments, volume 75, number 5, May 2004, pages 1209 ff. The content of these two publications is therefore to be added to its full extent to the present description as regards the desorption of the samples from the micro liquid jet so that at this point a detailed description of the techniques for the desorption of the samples from the micro liquid jet can be dispensed with. Therefore, the test system in accordance with the invention preferably includes a desorption apparatus with a laser.

Furthermore, the analysis of the samples desorbed from the micro liquid jet can also take place within the framework of the invention in a traditional manner, e.g., by a mass spectroscopic analysis. As regards the analysis of the samples desorbed from the micro liquid jet the two previously mentioned publications "Laser-angeregte Mikrofilamente für extreme Lichtquellen und Biomolekülanalytik" and "New design for a time-of-flight mass spectrometer with a liquid beam laser desorption ion source for the analysis of biomolecules" are likewise referred to, whose content is to be added to its full extent to the present description in this connection.

The micronozzle itself can be designed within the framework of the invention in a traditional manner and such micronozzles are described, e.g., in patent publication WO 2004/076071 A1. The content of this patent publication is therefore to be added to its full extent to the present description.

The individual samples in the micro liquid jet can have a spatial extension in the jet direction that is so large that each sample can be multiply struck by a laser impulse for desorption. Such a multiple desorption of sample molecules from the individual samples makes possible, e.g., a statistical evaluation of the resulting analysis results, e.g., by an average value formation. However, a prerequisite for this is that the product of the jet speed and the desorption period time (that is, as a rule the period time of the pulsed laser) must be smaller than the sample length of the individual samples in order that a sample moved by the micro liquid jet can be covered successively by several laser impulses.

However, there is also the alternative possibility that the individual samples in the micro liquid jet have such a small sample length in the jet direction that each sample can only be covered by a single laser impulse. In this instance the product of the jet speed and the desorption period time (that is, the period time of the pulsed laser light) is greater than the sample length. Such short samples advantageously make possible a mass throughput of a plurality of samples with a small sample substance input (sample amounts) at the same time.

In the test method in accordance with the invention the individual laser impulses must exactly strike the individual samples in order to bring about a desorption of sample substance from the micro liquid jet. There is therefore the possibility within the framework of the invention that the desorption (e.g., the laser impulses) is synchronized in such a manner, taking into account the sample length and the jet speed, that the individual laser impulses exactly strike one of the samples.

Such a synchronization can take place, e.g., passively in that the jet speed is detected and the laser impulses are triggered as a function of the jet speed.

However, it is also possible that the synchronization takes place actively. For example, an optical barrier can be used for this purpose through which the micro liquid jet passes so that the individual samples can be detected during their passage through the optical barrier. Then, the emission of the individual laser impulses can be triggered in such a manner as a function of this detection of the individual samples that they exactly strike the individual samples.

Furthermore, there is a possibility of adding a dye to the sample substance, which facilitates the optical recognition of the individual samples in the micro liquid jet and therewith the active synchronization.

The injection of the individual samples into the carrier liquid of the micro liquid jet preferably takes place upstream before the micronozzle since the flow speed of the carrier liquid is significantly lower there than in the micro liquid jet downstream behind the micronozzle.

For example, a sample magazine with several sample chambers can be used for the injection of the individual samples, which individual sample chambers of the sample magazine can be loaded with the individual samples. The sample magazine can then be introduced into the carrier flow conduit in such a manner that the carrier flow conduit flows through one of the sample chambers, entraining the sample substance located in it.

The sample magazine can be designed, e.g., like a revolver and can be correspondingly rotated during operation in order to introduce different samples into the carrier liquid.

The carrier liquid for receiving the samples to be analyzed can be, e.g., common water. However, the invention is not limited to water as regards the carrier liquid to be used but rather can also be realized with any other liquids.

It should furthermore be mentioned that the individual samples have, e.g., a sample volume in a range of 10 nl to 100 ml, any intermediate values within this range being possible. However, the sample volume is preferably in a range of 10 nl to 100 μl.

Moreover, it should be mentioned that the micro liquid jet preferably has a jet diameter in a range of 5 μm to 100 μm and a range of 5 μm to 30 μm proved to be especially advantageous.

Furthermore, the micro liquid jet has a jet speed preferably in a range of 20 m/s to 200 m/s and as regards the jet speed any intermediate values within the previously cited value range are also possible.

Furthermore, the micro liquid jet can contain a plurality of samples such as, e.g., more than 10, more than 50, or more than 100 samples between the micronozzle and its disintegration point at which the micro liquid jet disintegrates into drops.

However, it is also alternatively possible that the rapidly flowing micro liquid jet contains only a single sample between the micronozzle and the disintegration point, that is, in the so-called continuous range. Even in this instance a plurality of the samples can be analyzed in rapid succession, e.g., more than 5 samples per second.

In addition, it should be mentioned—although self-evident—that the micro liquid jet is injected as a rule into a vacuum or into a vacuum chamber in which vacuum chamber the desorption of the samples and/or the analysis of the samples take(s) place.

Finally, the invention also comprises a micro liquid jet as such that contains spatially delimited samples extending in the jet direction only along a portion of the micro liquid jet.

BRIEF DESCRIPTION OF SEVERAL VIEWS OF THE DRAWINGS

Other advantageous further developments of the invention are explained in detail in the following together with the description of the preferred exemplary embodiments of the invention using the figures.

DETAILED DESCRIPTION OF PREFERRED EMBODIMENTS

Figure 1:
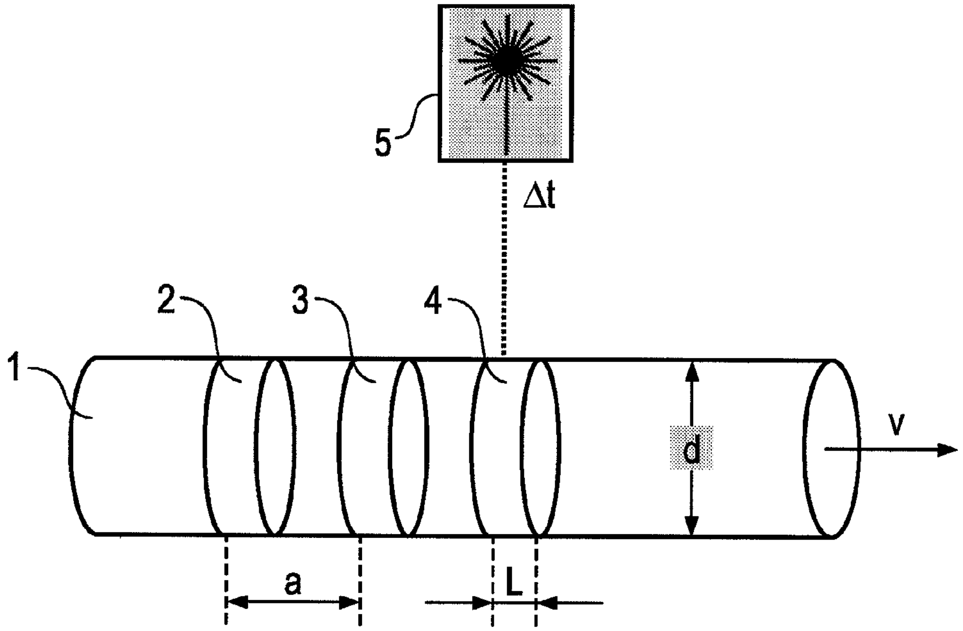
FIG. 1 shows a schematic representation of a micro liquid jet with several spatially delimited samples that are desorbed from the micro liquid jet in a laser-induced manner in order to make possible a mass spectroscopic analysis.

The schematic representation in FIG. 1 shows a micro liquid jet 1 with a jet diameter d in a range of 5 μm to 100 μm and a jet speed v in a range of 20 m/s to 200 m/s, the micro liquid jet 1 being injected through a known micronozzle into a vacuum and remaining stable in the vacuum up to a disintegration point (not shown) at which the micro liquid jet 1 then disintegrates into droplets.

The micronozzle itself is designed here in a traditional manner in accordance with patent publication WO 2004/076071 A1 so that a detailed description of the micronozzle can be dispensed with at this point.

Several samples 2-4 are introduced in a plug shape into the micro liquid jet 1, wherein the samples 2-4 can contain different sample substances in order to make possible a mass throughput analysis of a plurality of samples.

The individual samples 2-4 are irradiated by an infrared laser 5 with laser impulses for desorption from the micro liquid jet 1, which is known from the already previously cited publications "Laser-angeregte Mikrofilamente für extreme Lichtquellen und Biomolekülanalytik" and "New design for a time-of-flight mass spectrometer with a liquid beam laser desorption ion source for the analysis of biomolecules", so that in order to avoid repetitions the publications are referred to.

The infrared laser 5 emits the individual laser impulses here with a period time Δt that is adapted to the sample length L of the individual samples 2-4 in such a manner that the product from the jet speed v and the impulse period time is greater than the sample length L. This means that each of the samples 2-4 is struck only by a single laser impulse.

Figure 2:
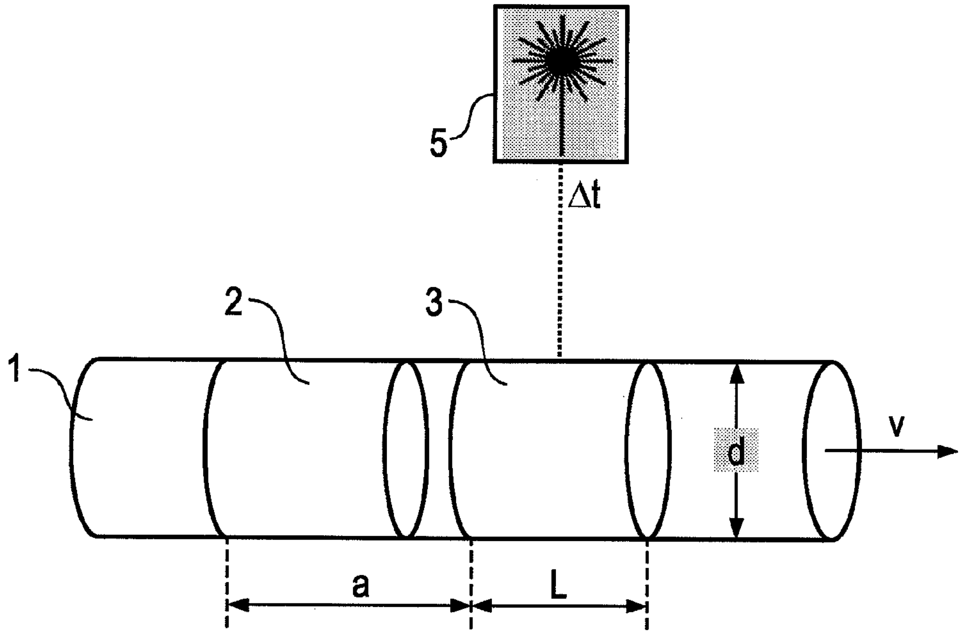
FIG. 2 shows a modification of such a micro liquid jet in which the individual samples are so long in the jet direction that they are detected by several laser impulses.

The exemplary embodiment shown in FIG. 2 largely coincides with the previously described exemplary embodiment shown in FIG. 1 so that in order to avoid repetitions the previous description is extensively referred to and the same reference numerals are used for corresponding parts and elements.

A particularity of this exemplary embodiment consists in the fact that the sample length L of the individual samples 2, 3 is significantly larger than in the exemplary embodiment according to FIG. 1. The product of the jet speed v and the impulse period time Δt is smaller here than the sample length L of the two samples 2, 3 so that each of the two samples 2, 3 is struck by several laser impulses. This has the consequence that several sample fragments from each of the samples 2, 3 are desorbed and separately analyzed. This makes an average value formation of the test results of the individual sample fragments possible.

Figure 3:
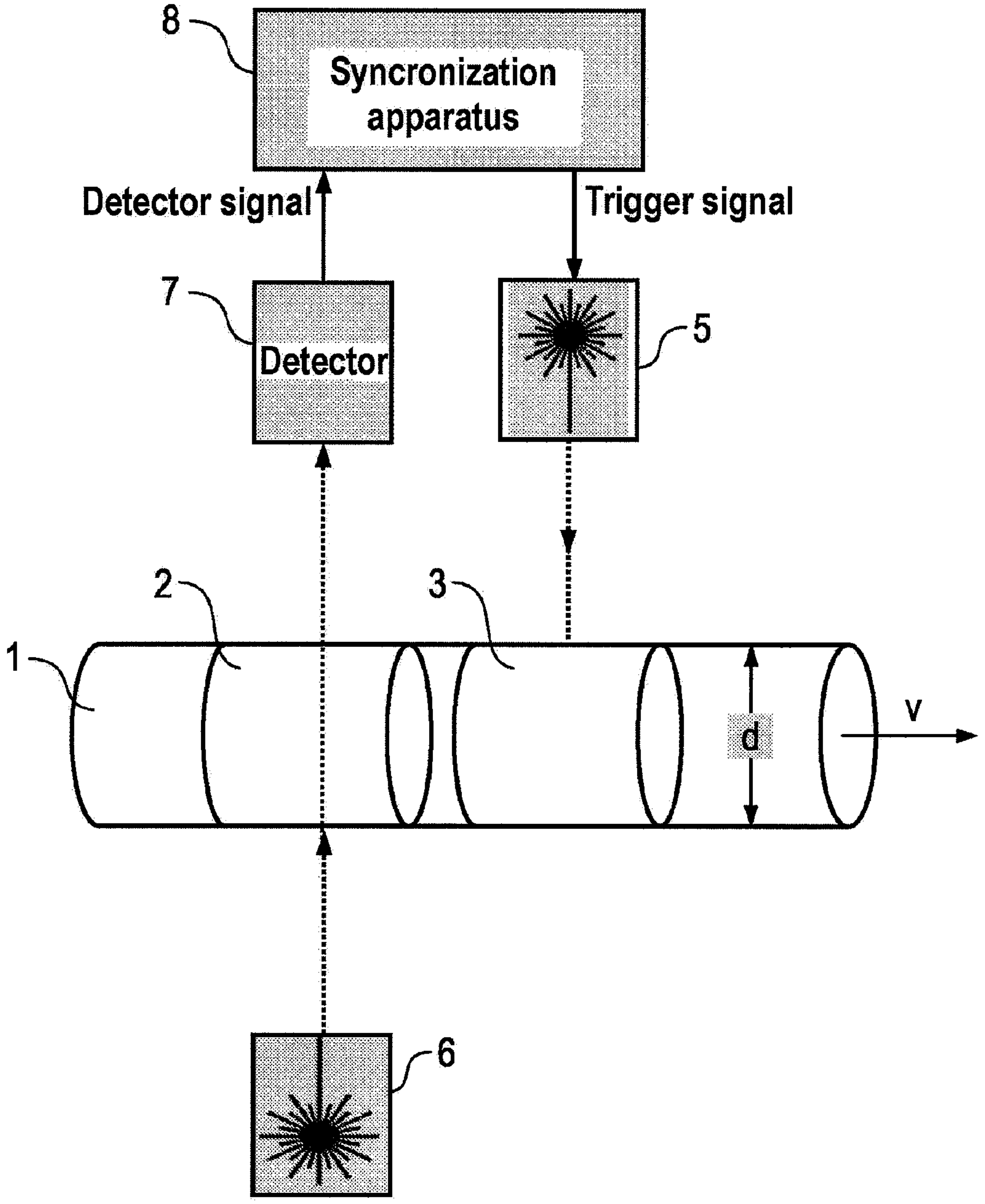
FIG. 3 shows a schematic representation of a test system in accordance with the invention with a light barrier for detecting the samples in the micro liquid jet and for synchronizing the emission of the laser impulses for the desorption of the individual samples.

The exemplary embodiment shown in FIG. 3 again corresponds largely with the previously described exemplary embodiment shown in FIG. 2, so that again the previous description for FIG. 2 is referred to in order to avoid repetitions. A particularity of this exemplary embodiment is that the emission of the laser impulses by the infrared laser 5 is triggered by a synchronization apparatus in order that the individual laser impulses exactly strike the samples 2, 3.

To this end, the exemplary embodiment has a light barrier consisting of a laser 6 and an optical detector 7, the laser beam emitted by the laser 6 passing through the micro liquid jet 1 and therefore making a detection of the individual samples 2, 3 during their passage through the laser beam possible.

The detector 7 controls a control unit 8 during the passage of the individual samples 2, 3, which control unit then triggers the infrared laser 5 in such a manner that the impulses emitted by it exactly strike the samples 2, 3.

Figure 4A:
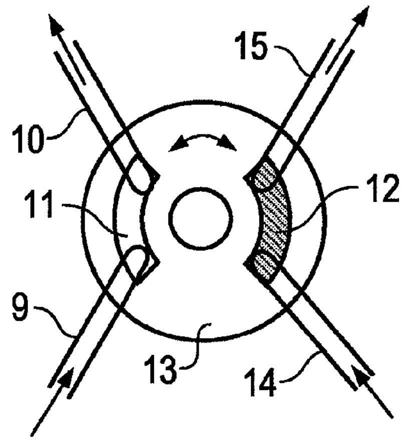
FIGS. 4*a*, 4B show an injection apparatus for introducing the samples into the carrier liquid of the micro liquid jet.
Figure 4B:
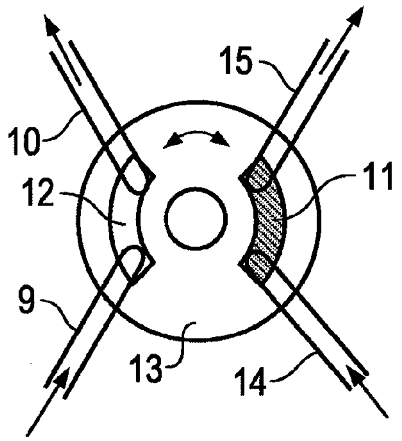

The FIGS. 4A and 4B show an injection apparatus that can be used to inject the samples 2, 3 into the trigger liquid of the micro liquid jet 1.

The injection apparatus is arranged here upstream before the micronozzle that injects the micro liquid jet 1 into the vacuum. This arrangement is advantageous since the flow speed of the carrier liquid upstream before the micronozzle is significantly lower than the one in the micro liquid jet 1 downstream behind the micronozzle, which facilitates the injection of the samples 2, 3.

The injection apparatus is arranged here in the carrier flow conduit that feeds the micronozzle, two carrier flow conduit sections 9, 10 being shown in the drawings.

The carrier liquid is supplied in the injection apparatus via the carrier flow conduit section 9 and leaves the injection apparatus again via the carrier flow conduit section 10 to the micronozzle that injects the micro liquid jet 1 into the vacuum.

In the injection apparatus the carrier liquid flows through one of two sample chambers 11, 12 of a sample magazine 13 that can rotate in the direction of the arrows.

In the position of the sample magazine 13 shown in FIG. 4A, the carrier liquid flows via the carrier flow conduit section 9 through the sample chamber 11 into the carrier flow conduit section 10 and then further to the micronozzle.

The other sample chamber 12 of the sample magazine 13 is then filled with sample substance, the sample substance being introduced via the sample feed conduit 14 into the sample chamber 12 and flows through it in the direction of the sample discharge conduit 15.

When the sample chamber 12 has been filled with the desired sample substance, the sample magazine 13 can be rotated in the direction of the arrow so that the sample chamber 12 filled with sample substance is located between the two carrier flow conduit sections 9, 10 and is therefore flushed with carrier liquid, during which the sample substance present in the sample chamber 12 is entrained with it.

During this time the other sample chamber 11 can be filled with a new sample substance, which is shown in FIG. 4B.

Figure 5A:
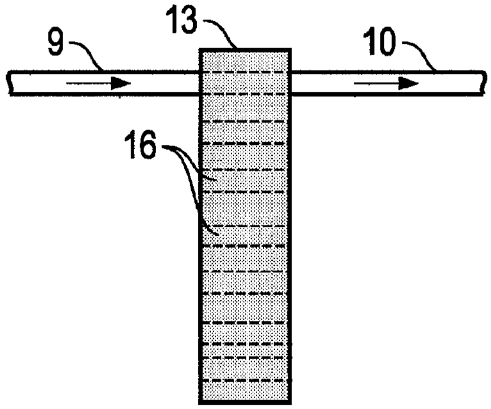
FIGS. 5A, 5B show an alternative embodiment of such an injection apparatus.
Figure 5B:
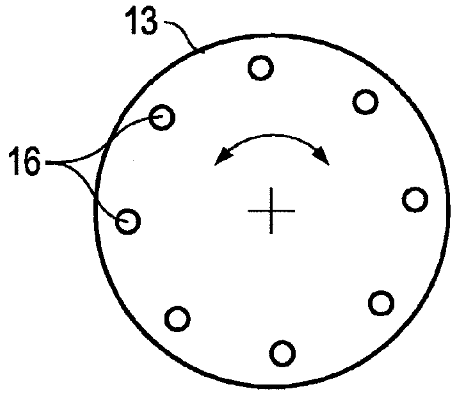

FIGS. 5A and 5B show an alternative exemplary embodiment of an injection apparatus for injecting the individual samples into the carrier liquid of the micro liquid jet 1.

This exemplary embodiment partially corresponds to the previously described exemplary embodiment shown in FIGS. 4A and 4B, so that in order to avoid repetitions the previous description for FIGS. 4A and 4B is referred to and the same reference numerals are used for corresponding components.

A particularity of this exemplary embodiment is that the sample magazine 13 is shaped like a revolver and can be rotated about an axis of rotation running substantially parallel to the carrier flow conduit sections 9, 10. The individual sample chambers 16 therefore form a coaxial component of the carrier flow conduit sections 9, 10 here in a rotary position.

The filling of the individual sample chambers 16 is not shown here for the sake of simplification; however, the filling of the sample chambers 16 is possible in a simple manner in that appropriate filling conduits abut on the front side against the revolver-shaped sample magazine 13.

The invention is not limited to the above-described preferred exemplary embodiments but rather a plurality of variants and modifications is possible that also make use of the concept of the invention and therefore fall under its protective scope.

The invention claimed is:

1. A test method comprising the following steps:

a) introduction of a sample to be analyzed into a carrier liquid, b) generation of a micro liquid jet from the carrier liquid with the sample contained therein, c) desorption of at least one part of the sample from the micro liquid jet, d) analysis of the sample desorbed from the micro liquid jet, wherein the sample in the micro liquid jet is spatially delimited in a jet direction and extends in the jet direction only along a portion of the micro liquid jet.

2. The test method according to claim 1, wherein several samples are introduced into the micro liquid jet in such a manner that the individual samples in the micro liquid jet are successively arranged in the jet direction and spatially separated from each other.

3. The test method according to claim 2, wherein the individual samples are injected by at least one controllable valve into the carrier liquid.

4. The test method according to claim 2, wherein the individual samples contain different sample substances.

5. The test method according to claim 2, wherein a) the individual samples are individually desorbed periodically from the micro liquid jet with a certain desorption period time, b) the individual samples in the micro liquid jet extend in the jet direction along a certain sample length, and c) the micro liquid jet has a certain jet speed.

6. The test method according to claim 2, wherein the periodic desorption of the individual samples is synchronized with the jet speed, taking into account the sample length.

7. The test method according to claim 6, wherein the synchronization takes place actively.

8. The test method according to claim 6, comprising the following steps:

detection of the individual samples by a light barrier, and synchronization of the desorption as a function of the detection by the light barrier.

9. A test system comprising:

a) a micronozzle for generating a micro liquid jet, the micro liquid jet containing a carrier liquid and at least one sample to be analyzed, b) a desorption apparatus for the desorption of at least a part of the sample from the micro liquid jet, c) an analyzing apparatus for analyzing the desorbed sample, and d) an injection apparatus that injects the sample into the carrier liquid of the micro liquid jet in a locally delimited manner so that the sample in the micro liquid jet extends in a jet direction only along a portion of the micro liquid jet.

10. The test system according to claim 9, wherein the injection apparatus injects several samples into the carrier liquid spatially separated from each other and located in succession in the jet direction.

11. The test system according to claim 9, wherein the injection apparatus has at least one controllable valve.

12. The test system according to claim 9, wherein the injection apparatus is arranged upstream before the micronozzle.

13. The test system according to claim 9, wherein a) a carrier flow conduit empties into the micronozzle, b) the injection apparatus has a sample magazine with several sample chambers, c) the sample chambers of the sample magazine can be loaded with the individual samples, and d) the sample magazine can be introduced into the carrier flow conduit in such a manner that the carrier flow conduit runs through one of the sample chambers.

14. The test system according to claim 13, wherein the sample magazine is rotatable.

15. The test system according to claim 14, wherein the sample magazine has an axis of rotation running parallel to the carrier flow conduit.

16. The test system according to claim 10, wherein a) the desorption apparatus desorbs the samples periodically from the micro liquid jet with a certain desorption period time, b) the individual samples in the micro liquid jet extend in the jet direction along a certain sample length, and c) the micro liquid jet has a certain jet speed.

17. The test system according to claim 10, further comprising a synchronization apparatus for synchronizing the desorption apparatus in accordance with the jet speed and the distance between the successive samples.

18. The test system according to claim 17, wherein the synchronization apparatus comprises a light barrier that detects the samples in the micro liquid jet.

19. A micro liquid jet containing a carrier liquid and at least one sample introduced into the carrier liquid, wherein the sample in the micro liquid jet is spatially delimited in the jet direction and extends in the jet direction only over a portion of the micro liquid jet and wherein individual samples form segments in the micro liquid jet, that otherwise consists of the carrier liquid.

20. The micro liquid jet according to claim 19, wherein several samples are present in succession in the micro liquid jet in the jet direction that are spatially separated from each other.

21. The test method according to claim 5, wherein the product of the jet speed and the desorption period time is smaller than the sample length.

22. The test method according to claim 5, wherein the product of the jet speed and the desorption period time is greater than the sample length.

23. The test method according to claim 6, wherein the synchronization takes place passively.

24. The test system according to claim 16, wherein the product of the jet speed and the desorption period time is smaller than the sample length.

25. The test system according to claim 16, wherein the product of the jet speed and the desorption period time is greater than the sample length.

* * * * *